(12) United States Patent
Su

(10) Patent No.: US 7,004,758 B2
(45) Date of Patent: Feb. 28, 2006

(54) LANGUAGE PHONETIC SYSTEM AND METHOD THEREOF

(76) Inventor: Kuojui Su, 13936 Wyandotte St., Van Nuys, CA (US) 91405

( * ) Notice: Subject to any disclaimer, the term of this patent is extended or adjusted under 35 U.S.C. 154(b) by 74 days.

(21) Appl. No.: 10/721,768

(22) Filed: Nov. 24, 2003

(65) Prior Publication Data

US 2005/0112532 A1 May 26, 2005

(30) Foreign Application Priority Data

Oct. 27, 2003 (CN) .............................. 92129706 A

(51) Int. Cl.
*G09B 17/00* (2006.01)
(52) U.S. Cl. .................................................. 434/178
(58) Field of Classification Search ............... 434/156, 434/167, 170, 178
See application file for complete search history.

(56) References Cited

U.S. PATENT DOCUMENTS

| 3,407,516 | A | * | 10/1968 | Isaac |
| 3,426,451 | A | * | 2/1969 | Banesh ........................ 434/178 |
| 4,007,548 | A | * | 2/1977 | Cytanovich ................. 434/178 |
| 4,030,211 | A | * | 6/1977 | McGinley .................... 434/167 |
| 4,193,212 | A | * | 3/1980 | Al-Kufaishi ................ 434/178 |
| 4,656,713 | A | * | 4/1987 | Rosa et al. ................. 434/178 |
| 6,077,080 | A | * | 6/2000 | Rai ............................. 434/170 |
| 6,126,447 | A | * | 10/2000 | Engelbrite .................. 434/167 |
| 6,468,083 | B1 | * | 10/2002 | Mathias ...................... 434/167 |
| 6,824,388 | B1 | * | 11/2004 | Goodfriend ................. 434/178 |

* cited by examiner

*Primary Examiner*—Kurt Fernstrom
(74) *Attorney, Agent, or Firm*—Raymond Y. Chan; David and Raymond

(57) ABSTRACT

A phonetics having vowel phonetic symbols separated into full sound symbols and half sound symbols, and consonant phonetic symbols. The full sounds symbols are represented by letters in the English phonetic symbol. The half sound symbols are represented by simple symbols. The phonetics is suitable for the traditional method of marking pronunciation in dictionaries and also suitable for directly marking the pronunciation on an actual word appearing in books, such that the phonetics can be promoted to be used in English teaching materials, enhancing learning effectiveness of learners.

6 Claims, 1 Drawing Sheet

LANGUAGE PHONETIC SYSTEM AND METHOD THEREOF

BACKGROUND OF THE PRESENT INVENTION

1. Field of Invention

The present invention relates to a learning tool, and more particularly to the utilization of phonetic symbols to guide learners to the correct English pronunciation.

2. Description of Related Arts

As English is one of the most widely used languages in the world, many people would like to acquire good command of it. However, different people learn by different methods, in which learning English through English phonetic symbols is one of the common methods. Currently, the most popular English phonetics are the Kenyon-Knott Phonetics, the Jones Phonetics and the Webster Phonetics. Despite the three types of phonetics have been in use for decades, each of them has a certain degree of flaws.

First, both Kenyon-Knott and Jones Phonetics take the International Phonetic Alphabet (IPA) as their phonetic symbols. Although the IPA has the advantage of being able to be used as phonetic symbols for other languages, however, for learners who only wish to learn English, IPA becomes an extra burden because the IPA has a lot of unfamiliar and easily mistaken symbols, and many symbols that can be found in the English alphabet but are pronounced differently.

As for the Webster Phonetics, because the original design of Webster Phonetic Symbols is very complicated, the Webster Phonetic Symbols is therefore not popular. Nowadays, the Webster Phonetic Symbols as appearing on dictionaries is in a simplified form, as a result, cannot compare with those in the original design.

Furthermore, as teaching materials, when analyzed, the above three phonetics share the following flaws:

1. The names of the phonetic symbols are not complete, causing inconvenience to both teaching and learning.

2. There is a lack of systematic analysis of the phonetics, such that most learners do not have a completely concept on the phonetics they are learning.

3. The usage of phonetic symbols is suitable for marking the pronunciation of English vocabularies in dictionaries, but not suitable for directly marking the pronunciation on an actual word in books. This is the upper limit of the function of phonetics.

Observing the above mentioned existing phonetics cannot provide sufficient help to learners, the inventor invented this new English phonetics, which not only improved the flaws of the above mentioned phonetics, but also provided a new classification of the full and half sounds of English vowels, so as to allow learners to correctly learn the characteristics of English vowels to achieve proper English pronunciation

SUMMARY OF THE PRESENT INVENTION

A main object of the present invention is to provide a phonetics for English learners to better and more correctly learn the pronunciation of English. The invention has the characteristics as listed below:

1. Vowels are classified into full sounds and half sounds to replace the traditional long sounds and short sounds. Phonetic symbols of full sounds are represented by letters in the English alphabet and half sounds by simple symbols. The above mentioned design emphasized the differences between full sounds and half sounds, so as to avoid giving the wrong impression to English learners by the classification of long and short sounds that the only difference between long sounds and short sounds is the length of pronunciation.

2. The phonetic symbols are suitable for the traditional method of marking English vocabularies pronunciation in dictionaries. It can also be suitable for directly marking the pronunciation on an actual word, such that the phonetics can be promoted to vocabularies in English teaching materials, minimizing errors in English pronunciation caused by the pronunciation guessing from the words.

3. There are a systematic analysis of the phonetics and a complete naming of phonetic symbols, enhancing learning effectiveness.

Accordingly, in order to accomplish the above objects, the present invention provides a type of English phonetic symbols, having vowel phonetic symbols and consonant phonetic symbols, wherein said English phonetic symbols comprising:

a plurality of vowel phonetic symbols comprises a plurality of full sound symbols, representing a plurality of pronunciation of complete syllables respectively and are predetermined to be capable of representing vowel sounds of syllables, and a plurality of half sound symbols, representing a plurality of half vowel sounds respectively and are predetermined to be insufficient to represent vowel sounds of syllables, wherein said half sound symbols is capable of representing the pronunciations of complete syllables when combined with a following consonant phonetic symbol;

a vowel phonetic symbol list having the characteristic of easy to learn and easy to memorize, wherein said vowel phonetic symbol list is formed by systematically arranging said plurality of vowel phonetic symbols; and a consonant phonetic symbol list formed by arranging a plurality of units comprising consonant phonetic symbols combined with a half sound symbol, wherein said consonant phonetic symbol list is suitable for reciting.

These and other objectives, features, and advantages of the present invention will become apparent from the following detailed description, the accompanying drawings, and the appended claims.

DETAILED DESCRIPTION OF THE PREFERRED EMBODIMENT

Figure 1:
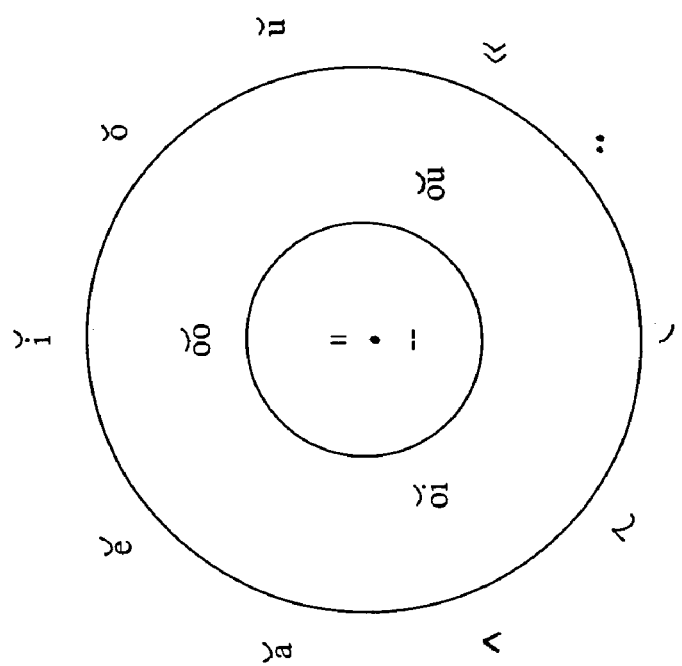
FIG. 1 illustrates sixteen phonetic symbols of a language phonetic system according to a preferred embodiment of the present invention.

Vowel phonetic symbols are separated into full sound symbols and half sound symbols. Full sound symbols are represented by letters in the English alphabet and can represent the pronunciations of complete syllables. The full sound symbols has a total of eight symbols: "a", "e", "i", "o", "u", "oi", "oo" and "ou", wherein the pronunciations of "a", "e", "i", "o" and "u" are equivalent to their pronunciations in the English alphabet. "oi" represents the "oi" sound in the word "oil"; "oo" represents the "oo" in the word "too"; "ou" represents the "ou" in the word "out". As they represent the pronunciations of complete syllables, the above eight symbols are named full sound symbols.

Pronunciations represented by the full sound symbols are equivalent to those represented by traditional phonetic symbols of long vowel sounds. Alone, the full sound symbols can represent the pronunciations of complete syllables. They can also be combined with other consonants to represent the pronunciations of different complete syllables.

Half sound symbols are represented by simple symbols, representing the pronunciations of incomplete syllables. The half sound symbols has a total of eight symbols: "^", "⌒", "⌒", ". .", "<<", "‖", ".", and "--". Pronunciations represented by the half sound symbols are equivalent to those represented by traditional phonetic symbols of short vowel sounds. The half sound symbols, however, have different usage. Half sound symbols are defined to represent the vowel sounds of incomplete syllables, and as a result, cannot be used alone to represent pronunciations of complete syllables, nor can they be used alone with a consonant symbol prior to it to represent the pronunciations of complete syllables. The usage of short vowel sounds of traditional phonetic symbols did not define the same rule. As a result, short vowel sounds of traditional phonetic symbols has very often been used alone to represent the vowel sounds of unstressed syllables.

The usage of half sound symbols is to be combined with its following consonant symbol. The combination is considered to have the functions of full sound symbols to represent the pronunciations of complete syllables, or further combines with other consonant symbols to represent the pronunciations of other complete syllables, for example, the half sound symbol "^" combines with a following consonant symbol "t" to represent the sound of "at" [^t], or further combine with a prior consonant symbol "s" to represent the sound of "sat" [s^t].

The full sound symbols are represented by letters in the English alphabet, has a total number of eight symbols: "a", "e", "i", "o", "u", "oi", "oo" and "ou". The half sound symbols are represented by simple symbols, has a total number of eight symbols: "^", "⌒", "⌒", ". .", "<<", "‖", ".", and "--".

Below is a list of the phonetic symbols, application example and name:

| Full Sound Symbol | Application Example | Vowel Sound Represented by Symbol | Name of Symbol |
|---|---|---|---|
| a | cake (kak) | full sound of "a" | "a full sound" symbol |
| e | he (he) | full sound of "e" | "e full sound" symbol |
| i | like (lik) | full sound of "i" | "i full sound" symbol |
| o | go (go) | full sound of "o" | "o full sound" symbol |
| u | fuse (fus) | full sound of "u" | "u full sound" symbol |
| oi | toil (toil) | full sound of "oi" | "oi full sound" symbol |
| oo | food (food) | full sound of "oo" | "oo full sound" symbol |
| ou | out (out) | full sound of "ou" | "ou full sound" symbol |

| Half Sound Symbol | Application Example | Vowel Sound Represented by Symbol | Name of Symbol |
|---|---|---|---|
| ^ | map (m^p) | half sound of "a" | "a half sound" symbol |
| ⌒ | set (s⌒t) | half sound of "e" | "e half sound" symbol |
| ⌒ | sit (s⌒t) | half sound of "i" | "i half sound" symbol |
| .. | dot (d..t) | half sound of "o" | "o half sound" symbol |
| ⁀ | push (p ⁀sh) | half sound of "u" | "u half sound" symbol |
| ‖ | log (l‖ g) | half sound plus of "o" | "o half sound plus" symbol |
| . | actor (act.r) | neutral half sound | "neutral half sound" symbol |
| -- | done (d--n) | half sound minus of "o" | "o half sound minus" symbol |

For learning convenience, the above phonetic symbols and names are designed to have relatively systematic, having the basic "a", "e", "i", "o" and "u" full sound symbols and their corresponding half sound symbols "^", "⌒", "⌒", ". ." and "<<". Also "o half sound plus", "o half sound", "o half sound minus" sound is a series of sound, where the name plus and minus symbolizes the relationship between them. The appearance of the phonetic symbols "‖" ("o half sound plus"), ".." ("o half sound") and "--" ("o half sound minus") can also reflect their nature as a series of the three above mentioned phonetic symbols.

Apart from the above sixteen phonetics symbols, this phonetics also has a full sound instruction symbol, the name of which is "swing". This "swing" symbol has no predetermined pronunciation. It is used for constraining the pronunciation of phonetic symbols or the combination of letters in vocabularies. The following is a description of its function:

1. it can be marked on full sound symbols, so as to specify the pronunciation characteristics of full sound symbols. The appearance of "swing" symbol, "˘", symbolizes a complete "swing" movement of a swing when pronouncing, which is the reason why this phonetic lists the symbol "swing" as full sound instruction symbol. As an example, "meet" can be marked as [met] or [mĕt], but [mĕt] has a clear instruction to learners that the pronunciation of the "ee" of the vocabulary should completely extend as a "swing" movement. The "swing" symbol "˘" has a very positive effect to English learning beginners. As a result, it is suitable to add the "swing" symbol "˘" to full sound symbols "a", "e", "i", "o", "u", "oi", "oo" and "ou" in teaching materials for beginners, so that the full sound symbols appear in the form of "ă", "ĕ", "ĭ", "ŏ", "ŭ", "ŏĭ", "ŏŏ" and "ŏŭ".

2. it can constrain half sound symbols, so as to extend the sound of half sound symbols. The half sound symbol being constrained will then have the characteristics of a full sound symbol, which is extending the sound it is representing to be the pronunciations of complete syllables. In actual application, the following three pronunciations of complete syllables are represented by half sound symbols constrained by the full sound instruction symbol, including "‖̆", "˘..", and "--̆". Actual examples are: "law" [l ‖̆], "the" [th ˘..] and pa [p ˘..].

3. it can constrain the combination of letters in vocabularies, such that the combination of letters represents a predetermined full sound. It is suitable for marking the sounds on an actual word itself, such as "mĕăt", "hĕĕl", "k ĕy" and "cĕĭling". It means that all "ea", "ee", "ey" and "ei" marked by the full sound instruction symbol "˘" represent the same "e full sound".

Below is a description of instructions on unstressed syllables of English vocabularies: Vowel sounds of unstressed syllables in English vocabularies are much lighter, therefore they naturally sounds shorter. As a result, this phonetics utilizes full sound symbols to represent the vowel sound of unstressed syllables. Users can achieve correct pronunciation as long as they meet the pronunciation requirements of unstressed syllables, for example, the "o" sound "auto" [‖ to], "y" sound of "city" [s⌒t e] and "e" sound of "return" [re t. rn]. Their sounds of the unstressed syllables are all represented by full sound symbols.

The figure below provides a systematic listing of vowel sound phonetic symbols suitable for English learning beginners. As a result, the full sound symbols are incorporated with the full sound instruction symbol "˘". The background of this vowel sound phonetic symbol figure is two concentric circles. On the outer periphery of the outer circle are five full sound symbols "ă","ĕ", "Ĭ", "ŏ" and "ŭ", and five half sound syllables "⌢", "⌒", "⌒", ". ." and "<<". In between the two concentric circles are the three full sound symbols "ŏĭ", "ŏŏ" and "ŏŭ". Inside the inner circle are the three half sound symbols "‖", ".", and "--". It can be easily seen that there are sixteen phonetic symbols all together, for easier understanding and memorizing as shown in FIG. 1.

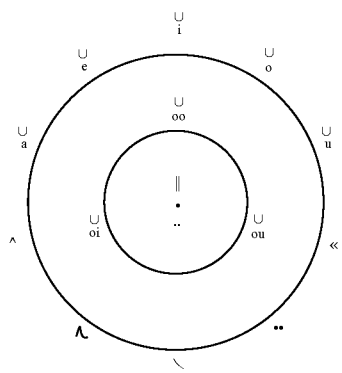

The pronunciation of consonant letters in English vocabularies can mostly be obtained from the letters themselves. As a result, many phonetics utilize consonant letters as their main consonant phonetic symbol. This phonetics, however, has its own specialty of forming a memorizing table of consonant symbols by combining a consonant symbol with the neutral half sound. The function of the memorizing table is to make learners to get used to the pronunciation method of English consonants after familiarizing or memorizing, so as to easier achieve proper pronunciation of English.

The consonant phonetic symbols of this phonetics are as listed below. The name and application of the symbols are in brackets.

| b | ("b consonant", be) | p | ("p consonant", put) | m | ("m consonant", may) | f | ("f consonant", fit) |
| d | ("d consonant", day) | t | ("t consonant", tea) | n | ("n consonant", no) | l | ("l consonant", let) |
| g | ("g consonant", go) | k | ("k consonant", key) | h | ("h consonant", he) | | |
| j | ("j consonant", joy) | ch | ("ch consonant", chip) | sh | ("sh consonant", she) | zh | ("zh consonant", azure) |
| X̌ | ("th sub-consonant", thin) | th | ("th consonant", the) | s | ("s consonant", soy) | z | ("z consonant", zoo) |
| y | ("y consonant", yes) | w | ("w consonant", we) | r | ("r consonant", ray) | v | ("v consonant", vote) |

Below is a list memorizing table of consonant phonetic symbols of this phonetics:

| b. | p. | m. | f. |
| d. | t. | n. | l. |
| g. | k. | h. | |
| j. | ch. | sh. | zh. |
| X̌. | th. | s. | z. |
| y. | w. | r. | v. |

Full sound symbols of vowel phonetic symbols of this phonetics are represented by letters in the English alphabet; half sound symbols by simple symbols. The characteristic of this design is that the symbols of this phonetics are suitable for directly marking on the actual vocabularies themselves. Below is the description of the description:

1. No phonetic symbol markings will be provided when the letters in the vocabulary have the same pronunciation as the same letters have in the phonetics, for example, there will be no markings for both the "g" and "o" in the word "go".

2. When a letter in a word is marked with a phonetic symbol, the letter being marked will have the same pronunciation as that represented by the phonetic symbol, for example, the "e" sound in "get ⌒" is "e half sound".

3. The length of a line below the first letter in a syllable indicates the level of stressing of an accented syllable.

4. When a combination of vowel letters in a word is marked by the full sound instruction symbol "⌣", the vowel letters are constrained to a predetermined pronunciation, including the following symbols, can be considered to be the predetermined full sound:

| ĕa | ĕe | ǎi | ǎy | the same as "e full sound" |
| ǎi | ǎy | | | the same as "a full sound" |
| ǒa | | | | the same as "o full sound" |
| ǔu | ǒw | | | the same as "u full sound" |
| ǒy | | | | the same as "oi full sound" |
| ǒw | | | | the same as "ou full sound" |

5. Pronunciations of letters in English vocabularies has certain regulations, as a result, not every letters require the marking of phonetic symbols. The most common example is "e" in "coke" is silent. Another is that the "tion" in words such as "location" usually has the same pronunciation. As a result, when applied to teaching materials, the markings of symbols can be simplified according to the level of the learners, such that direct markings on actual words can be promoted to English vocabulary teaching materials of different levels.

6. An example of direct markings on actual words:
Thât măĭl belongs tö me.

This phonetics can be applied on printed material, virtual media or other medium, so as to pass this English phonetics to learners.

One skilled in the art will understand that the embodiment of the present invention as shown in the drawings and described above is exemplary only and is not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An English phonetic symbols system, comprising:
a plurality of vowel phonetic symbols comprises a plurality of full sound symbols, wherein each of said plurality of full sound symbols represents a full vowel sound respectively and predetermined to be capable of representing a complete syllable pronunciation respectively, and a plurality of half sound symbols, wherein each of said plurality of half sound symbols represents a half vowel sound respectively and predetermined to be insufficient to represent said complete syllable pronunciation, wherein each of said plurality of full sound symbols is represented.by at least one letter in the English alphabet respectively and each of said plurality of half sound symbols is represented by a simple symbol respectively;
a plurality of consonant phonetic symbols, wherein each of said plurality of consonant phonetic symbols represents a consonant sound respectively, wherein said half sound symbols combine with said consonant phonetic symbols to represent said complete syllable pronunciations; and
a consonant phonetic symbol list, having a plurality of combined units systematically arranged therein, wherein each of said plurality of combined units comprises a consonant phonetic symbols and a half sound symbol, wherein said consonant phonetic symbol list is suitable for reciting; and
a vowel phonetic symbol list, provided for easy learning and memorizing, wherein said vowel phonetic symbol are systematically arranged therein.

2. An English phonetic symbols system, comprising:
a plurality of vowel phonetic symbols comprises a plurality of full sound symbols, wherein each of said plurality of full sound symbols represents a full vowel sound respectively and predetermined to be capable of representing a complete syllable pronunciation respectively, and a plurality of half sound symbols, wherein each of said plurality of half sound symbols represents a half vowel sound respectively and predetermined to be insufficient to represent said complete syllable pronunciation;
a plurality of consonant phonetic symbols, wherein each of said plurality of consonant phonetic symbols represents a consonant sound respectively, wherein said half sound symbols combine with said consonant phonetic symbols to represent said complete syllable pronunciations; and
a consonant phonetic symbol list, having a plurality of combined units systematically arranged therein, wherein each of said plurality of combined units comprises a consonant phonetic symbols and a half sound symbol, wherein said consonant phonetic symbol list is suitable for reciting; and
a vowel phonetic symbol list, provided for easy learning and memorizing, wherein said vowel phonetic symbol are systematically arranged therein;
wherein each of said plurality of vowel phonetic symbols has a vowel phonetic symbol name and a predetermined sound respectively, wherein said plurality of vowel phonetic symbols comprising:
an "ă" or "a" symbol, having a first symbol name of "a full sound", representing a first sound of "a" equivalent to an "a" in the English alphabet;
an "ĕ" or "e" symbol, having a second symbol name of "e full sound", representing a second sound of "e" equivalent to an "e" in the English alphabet;
an "ĭ" or "i" symbol, having a third symbol name of "i full sound", representing a third sound of "i" equivalent to an "i" in the English alphabet;
an "ŏ" or "o" symbol, having a fourth symbol name of "o full sound", representing a fourth sound of "o" equivalent to an "o" in the English alphabet;
a "ŭ" or "u" symbol, having a fifth symbol name of "u full sound", representing a fifth sound of "u" equivalent to a "u" in the English alphabet;
an "ŏĭ" or "oi " symbol, having a sixth symbol name of "oi full sound", representing a sixth sound equivalent to an "oi" of the English word "oil";
an "ŏŏ" or "oo " symbol, having a seventh symbol name of "oo full sound", representing a seventh sound equivalent to an "oo" of the English word "too".

3. The English phonetic symbols system, as recited in claim 2, wherein said vowel phonetic symbol list comprises a first group comprising said "a full sound" symbol, said "e full sound" symbol, said "i full sound" symbol, said "o full sound" symbol and said "u full sound" symbol, a second group comprising said "a half sound" symbol, said "e half sound" symbol, said "i half sound" symbol, said "o half sound" symbol and said "u half sound" symbol, a third group comprising said "oi full sound" symbol, said "oo full sound" symbol and said "ou full sound" symbol, and a fourth group comprising said "o half sound plus" symbol, said "neutral half sound" symbol" and said "o half sound minus" symbol.

4. The English phonetic symbols system, as recited in claim 2, wherein said vowel phonetic symbol list comprises a background of two concentric circles, wherein said "ă" symbol, said "ĕ" symbol, said "ĭ" symbol, said "ŏ" symbol, said "ŭ" symbol, said "⌒" symbol, said "⌒" symbol, said "⌒" symbol, said ". ." symbol and said "<<" symbol are arranged on an outer periphery of an outer circle of said concentric circles, said "oi" symbol, said "oo" symbol and said "ou" symbol are arranged between said two concentric circles, and said "‖" symbol, said "." symbol and said "--" symbol are arranged inside an inner circle of said concentric circles, as shown in the following diagram.

5. The English phonetic symbols system, as recited in claim 2, further comprising a "" symbol, having a seventeenth name of "swing symbol" and no predetermined pronunciation, wherein said "swing symbol" represents an instruction symbol for said full sounds, provided for marking on said phonetic symbols or on a combination of letters in English vocabulary to represent a predetermined full sound.

6. The English phonetic symbols system, as recited in claim 2, wherein when one of said vowel phonetic symbols is directly marked on a letter of an actual word, said letter has the same pronunciation as said sound represented by said vowel phonetic symbol.

* * * * *

UNITED STATES PATENT AND TRADEMARK OFFICE
CERTIFICATE OF CORRECTION

PATENT NO.      : 7,004,758 B2
APPLICATION NO. : 10/721768
DATED           : February 28, 2006
INVENTOR(S)     : Kuojui Su It is certified that error appears in the above-identified patent and that said Letters Patent is hereby corrected as shown below:

In Column 4, Line 20 of the patent certificate, change -- """" to "ᴗ" --

In Column 4, Line 27 of the patent certificate, change -- """" to "ᴗ" --

In Column 4, Line 29 of the patent certificate, change -- """" to "ᴗ" --

In Column 4, Line 32 of the patent certificate, change -- ""oi"" to " ŏĭ " --

In Column 4, Line 32 of the patent certificate, change -- ""oo"" to " ŏŏ " --

In Column 4, Line 32 of the patent certificate, change -- ""ou"" to " ŏŭ " --

In Column 4, Line 41 of the patent certificate, change -- ""_ _"" to " ᴗ ᴗ " --

In Column 4, Line 42 of the patent certificate, change -- ""[pˇ]"" to " [pˇ] " --

In Column 4, Line 46 of the patent certificate, change -- "měăt" to " měăt " --

In Column 4, Line 46 of the patent certificate, change -- "hěěl" to " hěěl " --

In Column 4, Line 47 of the patent certificate, change -- "kěy" to " kěy " --

Signed and Sealed this

First Day of June, 2010

David J. Kappos
*Director of the United States Patent and Trademark Office*

In Column 4, Line 47 of the patent certificate, change -- "cĕiling" to " cēiling " --

In Column 4, Line 65 of the patent certificate, change to -- """" to "⌣" --

In Column 5, Line 3 of the patent certificate, change -- "oĭ" to " oĭ " --

In Column 5, Line 3 of the patent certificate, change -- "oŏ" to " oŏ " --

In Column 5, Line 4 of the patent certificate, change -- "oŭ" to " oŭ " --

In Column 6, Line 50 of the patent certificate, change -- "maĭl" to " mãil " --

In Column 7, Line 32, claim 2 should be amended from:

"An English phonetic symbols system, comprising:

a plurality of vowel phonetic symbols comprises a plurality of full sound symbols, wherein each of said plurality of full sound symbols represents a full vowel sound respectively and predetermined to be capable of representing a complete syllable pronunciation respectively, and a plurality of half sound symbols, wherein each of said plurality of half sound symbols represents a half vowel sound respectively and predetermined to be insufficient to represent said complete syllable pronunciation;

a plurality of consonant phonetic symbols, wherein each of said plurality of consonant phonetic symbols represents a consonant sound respectively, wherein said half sound symbols combine with said consonant phonetic symbols to represent said complete syllable pronunciations; and a consonant phonetic symbol list, having a plurality of combined units systematically arranged therein, wherein each of said plurality of combined units comprises a consonant phonetic symbols and a half sound symbol, wherein said consonant phonetic symbol list is suitable for reciting; and a vowel phonetic symbol list, provided for easy learning and memorizing, wherein said vowel phonetic symbols are systematically arranged therein;

wherein each of said plurality of vowel phonetic symbols has a vowel phonetic symbol name and a predetermined sound respectively, wherein said plurality of vowel phonetic symbols comprising:

an "ă" or "a" symbol, having first symbol name of "a full sound", representing a first sound of "a" equivalent to an "a" in the English alphabet;

an "ĕ" or "e" symbol, having a second symbol name of "e full sound", representing a second sound of "e" equivalent to an "e" in the English alphabet;

an "ĭ" or "i" symbol, having a third symbol name of "i full sound", representing a third sound of "i" equivalent to an "i" in the English alphabet;

an "ŏ" or "o" symbol, having a fourth symbol name of "o full sound", representing a fourth sound of "o" equivalent to an "o" in the English alphabet;

an "ŭ" or "u" symbol, having a fifth symbol name of "u full sound", representing a fifth sound of "u" equivalent to a "u" in the English alphabet;

an " o̿i " or "oi" symbol, having a sixth symbol name of "oi full sound", representing a sixth sound equivalent to an "oi" of the English word "oil";

an "o̿o̿"or "oo" symbol, having a seventh symbol name of "oo full sound", representing a seventh sound equivalent to an "oo" of the English word "too"." to -- An English phonetic symbol system, comprising:

a plurality of vowel phonetic symbols comprises a plurality of full sound symbols, wherein each of said plurality of full sound symbols represents a full vowel sound respectively and predetermined to be capable of representing a complete syllable pronunciation respectively, and a plurality of half sound symbols, wherein each of said plurality of half sound symbols represents a half vowel sound respectively and predetermined to be insufficient to represent said complete syllable pronunciation;

a plurality of consonant phonetic symbols, wherein each of said plurality of consonant phonetic symbols represents a consonant sound respectively, wherein said half sound symbols combine with said consonant phonetic symbols to represent said complete syllable pronunciations; and a consonant phonetic symbol list, having a plurality of combined units systematically arranged therein, wherein each of said plurality of combined units comprises a consonant phonetic symbols and a half sound symbol, wherein said consonant phonetic symbol list is suitable for reciting; and a vowel phonetic symbol list, provided for easy learning and memorizing, wherein said vowel phonetic symbol are systematically arranged therein;

wherein each of said plurality of vowel phonetic symbols has a vowel phonetic symbol name and a predetermined sound respectively, wherein said plurality of vowel phonetic symbols comprising:

an "ă" or "a" symbol, having a first symbol name of "a full sound", representing a first sound of "a" equivalent to an "a" in the English alphabet;

an "ĕ" or "e" symbol, having a second symbol name of "e full sound", representing a second sound of "e" equivalent to an "e" in the English alphabet;

an "ĭ" or "i" symbol, having a third symbol name of "i full sound", representing a third sound of "i" equivalent to an "i" in the English alphabet;

an "ŏ" or "o" symbol, having a fourth symbol name of "o full sound", representing a fourth sound of "o" equivalent to an "o" in the English alphabet;

a "ŭ" or "u" symbol, having a fifth symbol name of "u full sound", representing a fifth sound of "u" equivalent to a "u" in the English alphabet;

an " o̅i " or "oi" symbol, having a sixth symbol name of "oi full sound", representing a sixth sound equivalent to an "oi" of the English word "oil";

an " o͞o " or "oo" symbol, having a seventh symbol name of "oo full sound", representing a seventh sound equivalent to an "oo" of the English word "too";

an " o͝u " or "ou" symbol, having an eighth symbol name of "ou full sound", representing an eighth sound equivalent to an "ou" of the English word "out";

a "∧" symbol, having a ninth symbol name of "a half sound", representing a ninth sound equivalent to an "a" of the English word "map";

a " ⋏ " symbol, having a tenth symbol name of "e half sound", representing a tenth sound equivalent to an "e" of the English word "set";

a " ∖ " symbol, having an eleventh symbol name of "i half sound", representing an eleventh sound equivalent to an "i" of the English word "sit";

a " ⋯ " symbol, having a twelfth symbol name of "o half sound", representing a twelfth sound equivalent to an "o" of the English word "not";

a "«" symbol, having a thirteenth symbol name of "u half sound", representing a thirteenth sound equivalent to a "u" of the English word "push";

a " ▮ " symbol, having a fourteenth symbol name of "o half sound plus", representing a fourteenth sound equivalent to an "o" of the English word "cost";

a "•" symbol having a fifteenth symbol name of "neutral half sound", representing a fifteenth sound equivalent to an "o" of the English word "actor"; and a "—" symbol, having a sixteenth symbol name of "o half sound minus", representing a sixteenth sound equivalent to a "u" of the English word "bus". --

In Column 8, Line 50, Claim 5 of the patent certificate, change -- """" to "⌣" --